US008248933B2

(12) United States Patent
Sharp

(10) Patent No.: US 8,248,933 B2
(45) Date of Patent: Aug. 21, 2012

(54) METHODS AND SYSTEMS FOR CAPABILITY-BASED SYSTEM COLLABORATION

(75) Inventor: David Clyde Sharp, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 436 days.

(21) Appl. No.: 12/044,778

(22) Filed: Mar. 7, 2008

(65) Prior Publication Data
US 2009/0225654 A1 Sep. 10, 2009

(51) Int. Cl.
*G01R 31/08* (2006.01)
(52) U.S. Cl. ......... 370/231; 709/229; 719/315; 719/316
(58) Field of Classification Search .................. 719/315, 719/316; 709/229; 370/231
See application file for complete search history.

(56) References Cited

U.S. PATENT DOCUMENTS

| | | | |
|---|---|---|---|
| 6,687,634 | B2 | 2/2004 | Borg |
| 6,742,015 | B1 | 5/2004 | Bowman-Amuah |
| 7,068,680 | B1 | 6/2006 | Kaltenmark et al. |
| 7,225,981 | B2 | 6/2007 | Jongebloed |
| 7,289,964 | B1 | 10/2007 | Bowman-Amuah |
| 7,324,920 | B2 | 1/2008 | Jha et al. |
| 2002/0124007 | A1* | 9/2002 | Zhao ............................. 707/102 |
| 2003/0005412 | A1* | 1/2003 | Eanes ........................... 717/120 |
| 2004/0174822 | A1 | 9/2004 | Bui |
| 2007/0033590 | A1* | 2/2007 | Masuouka et al. ............ 718/100 |
| 2008/0243900 | A1* | 10/2008 | Yohanan et al. ............... 707/102 |
| 2008/0298258 | A1* | 12/2008 | Susilo et al. .................. 370/248 |

FOREIGN PATENT DOCUMENTS
WO 02102093 A1 12/2002

OTHER PUBLICATIONS

International Search Report and Written Opinion of PCT/US2009/033914; Jun. 2, 2006; 17 pages.
Linam, N. et al.; OSDA: Open Service Discovery Architecture for Efficient Cross-Domain Service Provisioning; Computer Communications; Jan. 14, 2007; pp. 546-563; vol. 30 No. 3; Elsevier Science Publishers.
Koponen, T. et al.; A Service Discovery: A Service Broker Approach; System Sciences—Proceedings of the 37th Annual Hawaii International Conference on Jan. 5-8, 2004; pp. 284-290; IEEE.
Berbner, R. et al.; An Architecture for a QoS Driven Composition of Web Service Based Workflows; Networking and Electronic Commerce Research Conference; Oct. 6, 2005; 10 pages; River Del Garda, Italy.
Ahmed, R. et al.; Service Discovery Protocols a Comparative Study; Proceedings from the IFIP/IEEE International Symposium on Integrated Network Management (IM'2005) Application Sessions; 2005; pp. 1-13; Nice, France.

* cited by examiner

*Primary Examiner* — Anh-Vu H Ly
*Assistant Examiner* — Matthew Hopkins
(74) *Attorney, Agent, or Firm* — Armstrong Teasdale LLP

(57) ABSTRACT

A method for establishing a full end-to-end functionality chain of collaborating network accessible capabilities within a network centric environment is described. The method includes identifying the network accessible capabilities that are necessary to implement the end-to-end functionality chain, receiving data relating to which capabilities are available at each network node, determining if all necessary capabilities are available based on received responses to the data request, selecting one or more network accessible capability instances for each necessary network accessible capability, and executing the selected capability instances in an order that implements the end-to-end functionality chain.

20 Claims, 3 Drawing Sheets

METHODS AND SYSTEMS FOR CAPABILITY-BASED SYSTEM COLLABORATION

BACKGROUND OF THE INVENTION

The field of the invention relates generally to establishing collections of collaborating networked capabilities, and more specifically, to methods and systems for capability-based system collaboration to provide end-to-end functionality that is not feasible on a single system platform.

There are many existing software systems, for example, Common Object Request Broker Architecture (CORBA), Enterprise Java Beans (EJB), and Distributed Component Object Model (DCOM), to name a few, that allow software services on different platforms to identify, discover, and collaborate with services on other platforms.

However, there are disadvantages and limitations with these existing software systems in that the range of capabilities supported by each of these systems is limited to those within a single discovery domain. In other words, configuration of collections of capabilities are limited to instantiating new capabilities and connections (e.g. CORBA Component Model (CCM) Assemblies, CORBA Trader Service, CORBA Naming Service, and CORBA Interface Repositories), and not configuring ad hoc collections of capabilities from pre-existing capabilities executing independently on platforms.

In addition to these limitations, there are disadvantages and limitations with these existing software systems in that they do not provide centralized establishment and management of full end-to-end functionality chains, possibly including support for reconfiguration of the end-to-end functionality chains in the presence of faults.

Beyond these standard software systems, there is at least one known application that allows platforms to identify a single "level of interoperability" per platform and establish collaborations between platforms based on that single definition of combined available functionality.

There are disadvantages with this "level of interoperability" approach in that multiple unrelated capabilities cannot be hosted on a single platform and that capabilities cannot be identified and incorporated into end-to-end functionality chains without first identifying platforms and platform roles. In addition, only a linear chain of capabilities culminating in a single "level of interoperability" can be identified, located, and configured per system platform.

The above described solutions do not, however, solve the problem of establishing collections of collaborating networked capabilities to provide end-to-end functionality which is infeasible on a single system platform.

BRIEF DESCRIPTION OF THE INVENTION

In one aspect, a method for establishing a full end-to-end functionality chain of collaborating network accessible capabilities within a network centric environment is provided. The method includes identifying the network accessible capabilities that are necessary to implement the end-to-end functionality chain, receiving data relating to which capabilities are available at each network node, determining if all necessary capabilities are available based on received responses to the data request, selecting one or more network accessible capability instances for each necessary network accessible capability, and executing the selected capability instances in an order that implements the end-to-end functionality chain.

In another aspect, a method for providing collaborating network capabilities accessible from multiple communication frameworks within a network centric environment is provided. The method includes registering availability of each network capability with a dedicated single domain discovery service where each single domain discovery service is associated with an individual communication framework and the network capabilities accessible from the individual communication framework. The method continues with the collection of registrations from multiple single domain discovery services into a multiple domain discovery service which spans multiple communication frameworks. The method also includes retrieving, from at least one of the multiple domain discovery services, registrations for a plurality of desired network capabilities, the retrieved registrations associated with the communication frameworks the multiple domain discovery service is able to access, selecting a single registration for each desired network capability from the one or more multiple domain discovery services, and accessing the desired network capabilities using the individual communication framework associated with the selected registration for each desired network capability.

In still another aspect, a system of computer networks is provided that includes a multiple domain discovery service and at least one processing node. The multiple domain discovery service is configured to receive registrations for collaborating network capabilities from a plurality of single domain discovery services. At least one processing node is programmed to select one or more network capabilities to be executed in an order that implements an end-to-end functionality chain and execute the selected network capabilities instances.

DETAILED DESCRIPTION OF THE INVENTION

The embodiments described herein relate to methods and associated devices for establishing collaborations among multiple networked platforms where each platform provides multiple distinct simultaneous capabilities. More specifically, the methods and device provide a capability, operable across multiple platforms, to identify and discover capabilities of interest on other networked platforms, including those platforms residing within different discovery domains. Examples of discovery domains include Common Object Request Broker Architecture (CORBA), Enterprise Java Beans (EJB), and Distributed Component Object Model (DCOM). The embodiments described herein allow for the configuration of these various discovery domain capabilities into end-to-end network centric operation systems, due to integration of networked software across different discovery domains.

The described embodiments, in at least one aspect, focus on establishing full end-to-end functionality chains as opposed to establishing individual relationships between network capabilities. As further explained herein existing approaches are based on individual connections between executing capabilities and the defining of functionality chains prior to their execution.

Figure 1:
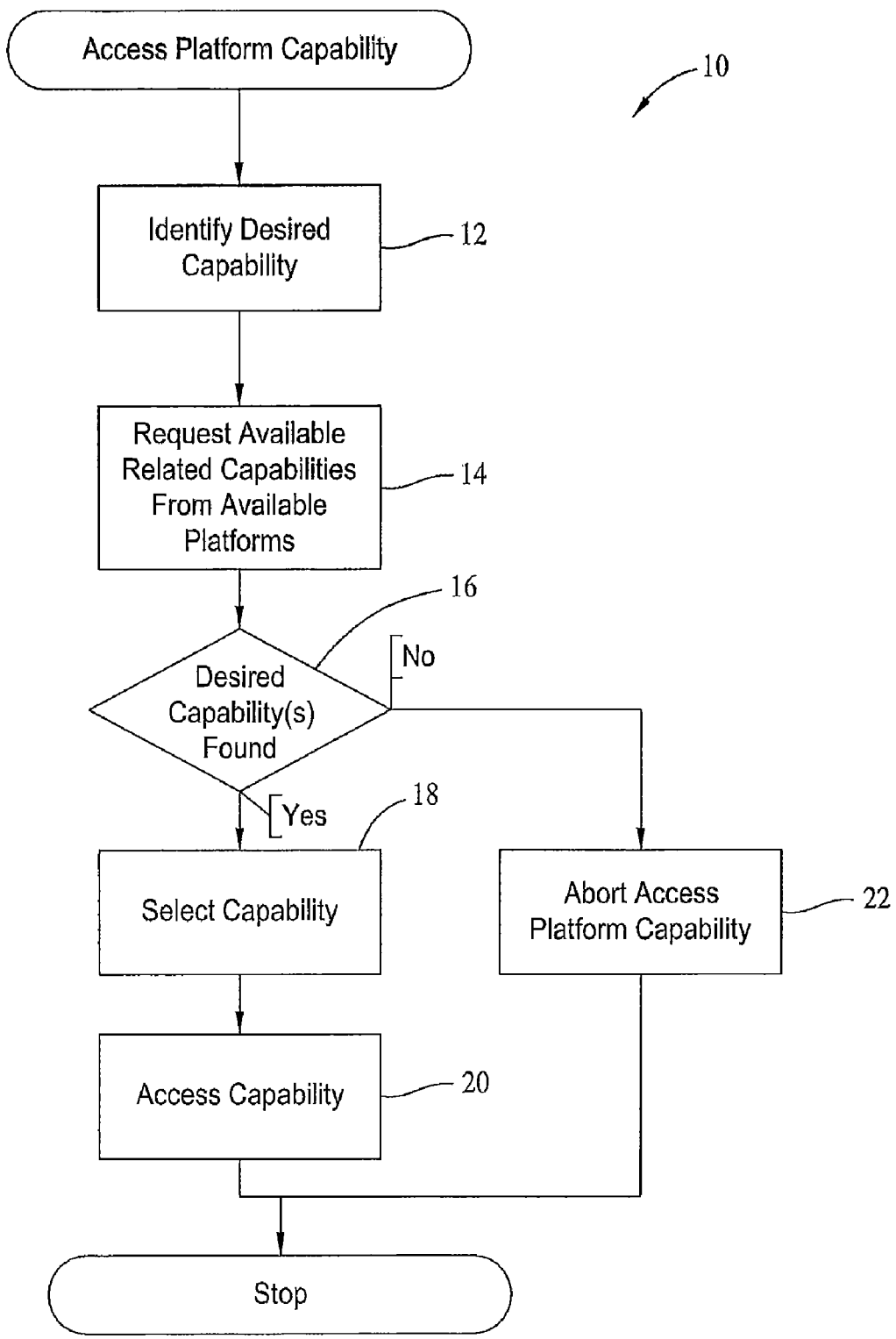
FIG. 1 is an access platform capability flowchart that illustrates a method for one software application to interoperate with, and use, a capability available on a computer network.

FIG. 1 is an access platform capability flowchart 10 that illustrates a method for one software application, referred to a "using software application" to interoperate with and use a capability available on a network. Now referring to flowchart 10, the using software application identifies 12 the desired network capability. Network capabilities are identified independently of the platform on which they execute ("host platform"), although it may be specified that some capabilities are associated in some way with a specific platform. For example, it may be specified that the capability executes on a particular platform (e.g. one with which the using software application has a high bandwidth network connection) or controls a particular platform (e.g. a specific unmanned vehicle).

In one embodiment, the using software application uses a multi-domain discovery service to request 14 all of the network capabilities which match the desired capability. Either prior to, or after, the multi-domain discovery service request, network capabilities register themselves with individual discovery services to advertise their availability within the discovery domains they support. Each discovery domain represents a set of capabilities supporting interfaces in a common language (e.g. IDL in CORBA, Java in EJB). The multi-domain discovery service supports querying for capabilities in multiple discovery domains. Results of a multi-domain discovery service query include an identifier for the capability (s) matching the desired capability(s) and the discovery domain(s) by which they may be accessed.

Capabilities belong to one or more capability categories including, but not limited to, one or more of platform independent capabilities which execute on a particular platform but otherwise have no specific platform relationship, execution platform dependent capabilities which are constrained to execute on a particular platform(s), controlling platform dependent capabilities which execute on one platform but are statically or dynamically allocated to control and/or interface with a separate platform(s), network dependent capabilities which are constrained to execute on a particular platform(s) based on the network connectivity between that platform and some other platform (e.g. connectivity to a platform being controlled), and personnel dependent capabilities which are constrained to execute on behalf of specific system operators, possibly executing on the specific platforms with which those operators directly interact.

Characteristics of the capabilities are described in the discovery service with information referred to as capability metadata. Capability metadata includes, but is not limited to, a unique identifier of the capability itself, associated capability category(s), supported discovery domain(s), and the platform on which the capability is executing. Some capability metadata is unique to certain capabilities. Metadata for controlling platform dependent capabilities include the platform(s) being controlled and/or interfaced with. Network dependent capability metadata include expression of the relevant platforms and characteristics of network connectivity between those platforms necessary for successful operation (e.g. high bandwidth connectivity). Personnel dependent capability metadata include expressions of the personnel and/or personnel roles that must be co-resident with the capabilities desired or capabilities which must be executing on behalf of those personnel.

Referring again to the flowchart 10, the using application determines whether the desired capabilities were found 16, that is, whether any matches were returned from its multi-domain discovery service query. If multiple capabilities are returned from the query, the using application selects 18 the most desirable capability based on available capability metadata. Once a capability is selected 18 for use, the using application accesses 20 the capability using the communication services associated with the discovery domain. One example is an object request broker for CORBA. The using application may select 18 additional capabilities for use in the future if the originally selected capability fails or otherwise becomes unavailable.

If no capabilities are returned from the query, the using application aborts 22 usage of the associated platform capability. If there are one or more alternate capabilities that may support the (potentially degraded) end-to-end functionality chain, the using application begins the process associated with flowchart 10 over again with an alternate capability.

Figure 2:
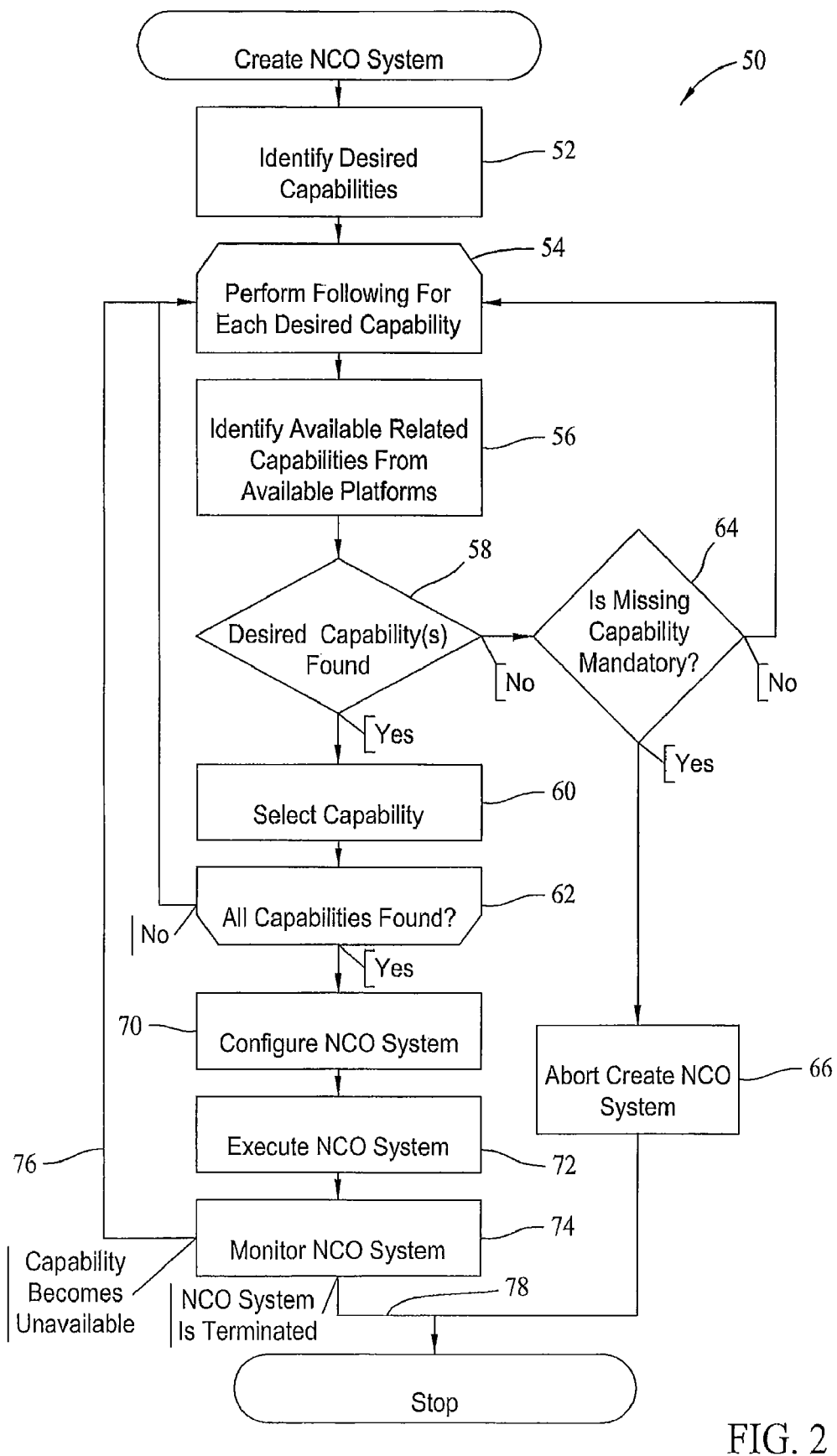
FIG. 2 is a flowchart that describes a method for configuring end-to-end functionality chains across multiple capabilities and multiple platforms.

FIG. 2 is a flowchart 50 for creating a network-centric operation (NCO) system and specifically describes a method for configuring end-to-end functionality chains across multiple capabilities and multiple platforms. Referring to flowchart 50, a full set of capabilities desired for the end-to-end functionality chain is identified 52. Each capability is identified 52 as being mandatory or optional for the functionality chain. In addition, a specific set of platforms to be used for the NCO system may be identified 52. As signified by block 54 of flowchart 50, the steps described in the following paragraphs are repeated for each desired capability.

As described with respect to FIG. 1, a software application uses a multi-domain discovery service to identify 56 all of the network capabilities which match the desired capability. The identified network capabilities register themselves with individual discovery services to advertise their availability within the discovery domains they support. As described previously, each discovery domain represents a set of capabilities supporting interfaces in a common language. The multi-domain discovery service supports querying for capabilities in multiple discovery domains. Results of a multi-domain discovery service query include an identifier for the capabilities matching the desired capabilities and the discovery domains by which they may be accessed.

In practical terms, a user wishes to access a capability, for example a program or other piece of software, that is running on another platform. To identify such software the user has to describe what program or other piece of software is that they are looking for, in other words, identifying 56 the entire capability. Identification 56 of capabilities, in one embodiment, includes sending out a list of characteristics or names, for example, in character strings or enumerations.

Capabilities belong to one or more capability categories including, but not limited to one or more of, platform independent capabilities which execute on a particular platform but otherwise have no specific platform relationship, execution platform(s) dependent capabilities which are constrained to execute on a particular platform, controlling platform dependent capabilities which execute on one platform but are statically or dynamically allocated to control and/or interface with a separate platform(s), network dependent capabilities which are constrained to execute on a particular platform(s) based on the network connectivity between that platform and some other platform (e.g. connectivity to a platform being controlled), and personnel dependent capabilities which are constrained to execute on behalf of specific system operators, possibly executing on the specific platforms with which those operators directly interact.

Again referencing flowchart 50, the using application determines whether the desired capabilities were found 58, that is, whether any matches were returned from its multi-domain discovery service query. If multiple capabilities are returned from the query, the using application selects 60 the most desirable capability based on available capability metadata.

If all capabilities in the desired set of capabilities have not been selected 60, that is have not yet been found 62, the method returns to block 54 to repeat the identification, searching, and selection process for the next capability to be selected 60. Additionally, if any mandatory capability is missing 64, the method returns to block 54 to repeat the identification, searching, and selection process for the next capability to be selected 60. If any mandatory capability cannot be found, as illustrated by 64, creation of the network-centric operations (NCO) system is aborted 66.

Once all mandatory capabilities are found 58 and selected 60, all included capabilities are configured 70 and organized into an NCO system. This includes, but is not limited to, the operation of connecting interfaces between capabilities which need to interact to support the functionality chain. Once configured 70, the NCO system is initialized and begins operating 72, which is sometimes referred to as executing the NCO system.

While operating 72, the NCO system is monitored 74 for any failures or other exceptional conditions. If network connectivity fails, one or more capabilities and/or platforms may become inaccessible. Individual capabilities may fail. If one or more capabilities become unavailable 76 for any reason, the method returns to block 54 to accommodate the change. More specifically, an identification, searching, and selection process as described above is conducted to replace the capability that has become unavailable. If the purpose of a particular NCO system is complete, the NCO system itself or an operator may terminate 78 the NCO system, releasing any reserved capabilities and network resources for other NCO systems or other purposes.

As mentioned above, there are many existing software systems, CORBA, EJB, and DCOM to name a few, which allow software services on different platforms to identify, discover, and collaborate with services on other platforms. In contrast, the above described embodiments result in an ability to identify, provide, and use multiple capabilities per platform in several different categories and in multiple discovery domains. In addition, an ability to configure multiple preexisting capabilities executing on multiple platforms into end-to-end chains of functionality in an ad hoc manner is provided as well as an ability to express intent to use capabilities for one or more end-to-end functionality chains. In a particular embodiment, expressing a usage intent may include restricting or prohibiting use of a particular capability by other functionality chains.

The described embodiments support capabilities that are made available via multiple discovery domains, in addition to supporting identification and location of related alternate capabilities which are not related to the originally desired capability by object oriented inheritance within a single language. Utilizing the embodiments, collections of networked capabilities are established which collectively work towards a single objective where there are multiple preexisting capabilities executing on potentially multiple platforms. Further, maintenance of end-to-end functionality chains is supported by informing those capabilities or controllers for those capabilities that they are in use and are not to be terminated or otherwise obstructed.

Figure 3:
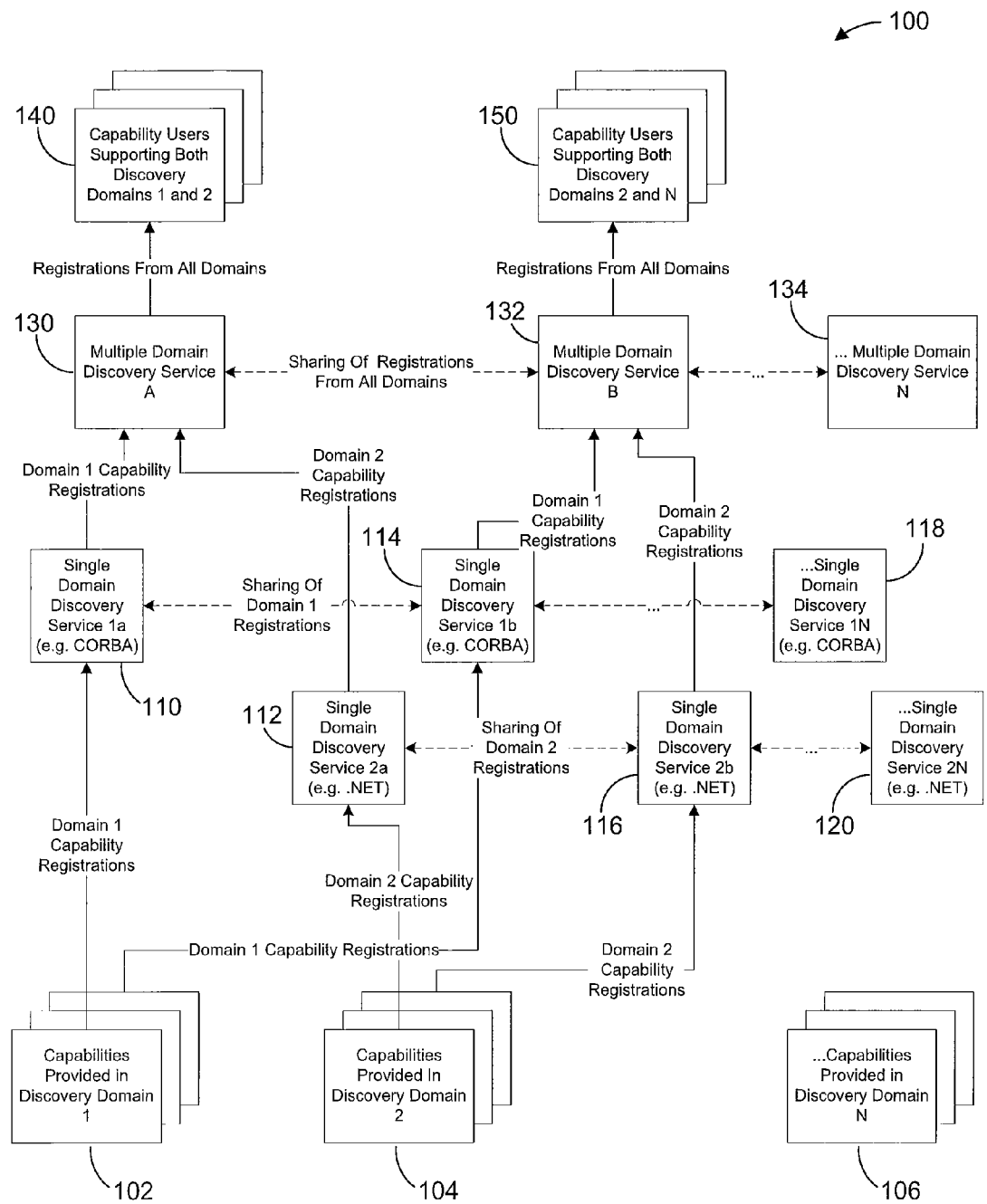
FIG. 3 is a diagram illustrating a multiple domain discovery service (MDDS) based system of systems.

FIG. 3 is an illustration of one embodiment of a multiple domain discovery service (MDDS) based system of systems 100. MDDS system of systems 100 generally illustrates that capabilities 102, 104 and 106 may be provided in different discovery domains, and registered with various single domain discovery services (SDDSs) 110, 112, 114, 116, 118, and 120. As illustrated in FIG. 3, capability registrations may be shared between discovery services within each domain. Particularly, domain 1 capability registrations are shared across SDDSs 110, 114, and 118, while domain 2 capability registrations are shared across SDDSs 112, 116, and 120. The multiple domain discovery services 130, 132, and 134 are operable to allow capability registrations from both domain 1 and domain 2 to be shared. The capability registrations from multiple domains are made available to users as illustrated by capability users 140 and 150. The capability users 140 are supported by both discovery domain services 1 and 2, while the capability users 150 are supported by both discovery domain services 2 and N.

Still referring to FIG. 3, when initialized, individual capabilities are registered with a single domain discovery service (s) (SDDSs) which is associated with the communication framework(s) that the discovery service supports. In FIG. 3, each capability (102, 104, and 106) supports only a single communication framework, but via the configuration of the system of systems 100 approach of FIG. 3, these capabilities associated with diverse communication frameworks are integrated into a single system of systems 100. These capabilities may be executing on the same or different platforms from each other and from the associated discovery services. This is true of both SDDSs or MDDSs.

The MDDSs (130, 132, 134) associated with each domain share registrations. This may be done, for example, when registrations are initially collected or when registrations are specifically requested by capability users. Each MDDS (130, 132, 134) obtains registrations from SDDSs (110, 112, 114, 116, 118, and 120) associated with multiple, and possibly all of the communication frameworks. These registrations may be obtained originally in a number of ways. In one embodiment, the MDDS may include proxies for the associated SDDSs, thereby appearing to the SDDSs as if they are standard SDDSs and collecting any registrations shared between SDDSs.

Capability users (140 and 150) which support (any set of) multiple communication frameworks query an MDDS for references to capabilities they desire. Once registrations are received, capability users assess which communication framework(s) are supported by those received registrations, select the preferred communication framework to be used for interactions, and transform the registration into the native form associated with that communication framework.

If any form of undesired response is observed when using the capability in the selected communication framework (e.g. failure to communicate, delays in communication), the capability user (140 and 150) may select an alternate registration and communication framework to access the used capability.

The provided capabilities (102, 104, and 106) in FIG. 3 are illustrated as separated from the user capabilities (140 and 150), but they need not be distinct. For example, a single capability may be a provider (of itself) and also a user of other capabilities.

As compared to existing solutions, the described system of systems embodiments include an increased composition capability that allows a broader range of capabilities to be integrated into end-to-end functionality chains while allowing each platform to provide multiple, possibly unrelated, capabilities to the networked end-to-end functionality chain. In addition, an increase in control allows for centralized establishment of end-to-end functionality chains from potentially preexisting capabilities executing on potentially multiple platforms and improved maintenance of the end-to-end functionality chains by expressing usage interest in capabilities. Maintenance of end-to-end functionality chains is enhanced by informing those capabilities or controllers within the functionality chains that they are in use and are not to be terminated or otherwise obstructed.

The above described embodiments are applicable to the establishment of network centric systems and systems of systems. These types of systems are provided to customers in various markets, and are growing in importance as customers demand system integration at increasing scales. The various embodiments help to reduce the cost of implementation of network centric systems by allowing a greater diversity of capabilities that may be integrated. This integration of capabilities results in increasing amounts of software reuse while also allowing a smaller number of platforms to support the same end-to-end functionality chains by allowing a single platform to provide multiple capabilities.

The described embodiments allow a provider to integrate a broader set of capabilities in creating network centric systems than competitors, including capabilities provided by other providers. Providers can field network centric systems of a given functionality set with fewer platforms due to increased numbers of capabilities being provided on each platform.

Customers of the providers benefit since fewer platforms are needed to support the same end-to-end functionality, thereby reducing their operations and support cost. Secondarily these customers benefit since a greater reuse of prior capability development investments results, potentially from many different providers.

While the invention has been described in terms of various specific embodiments, those skilled in the art will recognize that the invention can be practiced with modification within the spirit and scope of the claims.

What is claimed is:

1. A method for establishing a full end-to-end functionality chain of collaborating network accessible capabilities within a network centric environment, said method comprising:
    providing a plurality of network accessible capabilities, each having a registered availability and supporting a plurality of individual communication frameworks;
    identifying, by a software application at a networked platform, the network accessible capabilities that are necessary to implement the end-to-end functionality chain;
    receiving a first set of data relating to which network accessible capabilities are available at each network node;
    determining if the network accessible capabilities associated with the first set of data are available based on received responses to the data request;
    selecting one or more network accessible capability instances for each network accessible capability associated with the first set of data;
    executing the selected network accessible capability instances in an order that implements the end-to-end functionality chain; and
    monitoring the one or more network accessible capabilities for a connectivity failure of a first capability instance of the selected network accessible capability instances, wherein a second set of data relating to which necessary network capabilities are available at each network node is received if the connectivity failure of the first capability instance occurs.

2. A method according to claim 1 wherein executing the selected network accessible capability instances comprises causing selected network accessible capability instances to collaborate via a middleware communication framework.

3. A method according to claim 1 wherein executing the selected network accessible capability instances comprises sharing information between the network accessible capabilities to establish references between the network accessible capabilities.

4. A method according to claim 1 wherein identifying the network accessible capabilities comprises one of:
    identifying the network accessible capabilities while the network centric environment is operational; and
    identifying the network accessible capabilities prior to the network centric environment being operational.

5. A method according to claim 1 wherein the network accessible capabilities are centrally defined and coordinated.

6. A method according to claim 1 wherein selecting one or more network accessible capability instances comprises assigning network accessible capability instances to one or more capability categories, where the capability categories include at least one of:
    platform dependent capabilities which are constrained to execute on at least one particular platform;
    platform dependent capabilities which execute on one platform but are statically or dynamically allocated to control and interface with a separate platform;
    network dependent capabilities that are constrained to execute on a particular platform based on a network connectivity between that particular platform and another platform; and
    personnel dependent capabilities that are constrained to execute on behalf of specific system operators on specific platforms with which those operators interact.

7. A method according to claim 1 wherein identifying the network accessible capabilities comprises examining metadata associated with the network accessible capabilities to determine all of:
    a unique identifier for each network accessible capability;
    at least one associated capability category for each network accessible capability;
    at least one communication framework associated with each network accessible capability; and
    a network node on which each network accessible capability can be executed.

8. A method according to claim 1 wherein selecting one or more network accessible capability instances for each network accessible capability associated with the first set of data comprises accessing multiple instances of the same network accessible capability to support end-to-end functionality.

9. A method according to claim 1 wherein at least one selected network accessible capability instance is executed or is in the process of execution prior to selection of all of the network accessible capability instances necessary to support the end-to-end functionality chain.

10. A method for providing collaborating network capabilities accessible from multiple communication frameworks within a network centric environment, said method comprising:
    registering availability of each network capability executed by a plurality of networked platforms with a dedicated single domain discovery service where each single domain discovery service is associated with an individual communication framework and the network capabilities accessible from the individual communication framework;
    providing a plurality of network capabilities, each supporting a plurality of individual communication frameworks;
    collecting registrations from multiple single domain discovery services into one or more multiple domain discovery services which span multiple communication frameworks;
    retrieving, from at least one of the multiple domain discovery services, a first set of registrations for a plurality of desired network capabilities from the provided network capabilities, the retrieved registrations associated with the communication frameworks the multiple domain discovery service is able to access;

selecting a single registration for each desired network capability from the one or more multiple domain discovery services;

accessing the desired network capabilities executed by the networked platforms using the individual communication framework associated with the selected registration for each desired network capability; and monitoring the desired network capabilities for a connectivity failure of a first registration of the first set of registrations, wherein a second set of registrations for the plurality of desired network capabilities is retrieved if the connectivity failure of the first registration occurs.

11. A method according to claim 10 wherein selecting a single registration for each desired network capability comprises selecting the single registration from multiple registrations for each desired network capability.

12. A method according to claim 10 wherein selecting a single registration for each desired network capability comprises selecting the single registration from registrations across multiple communication frameworks for each desired network capability.

13. A method according to claim 10 wherein the one or more multiple domain discovery services share network capability registrations that have been received from a plurality of singe-domain discovery services.

14. A method according to claim 10 wherein multiple instances of the same capability, at least a portion of the multiple instances of the same capability accessible from different communication frameworks, are used to support continued operation of the network centric environment in a selected single registration fails.

15. A system of computer networks, said system comprising:

a multiple domain discovery service configured to receive registrations for collaborating network capabilities from a plurality of single domain discovery services, each single domain discovery service associated with an individual communication framework, the network capabilities executed by a plurality of networked platforms, each network capability supporting a plurality of individual communication frameworks; and at least one processing node programmed to:

select one or more network capability instances to be executed in an order that implements an end-to-end functionality chain, the selected one or more network capability instances associated with the network capabilities;

execute the one or more selected network capability instances;

inform a controller for at least one selected network capability that the selected network capability is in use, wherein said informing indicates that a first network capability instance associated with the selected network capability should not be terminated; and monitor the one or more selected network capabilities for a connectivity failure of the first network capability instance, and re-select one or more network capability instances to be executed if the connectivity failure of the first network capability instance occurs.

16. A system according to claim 15 comprising a plurality of processing nodes, said multiple domain discovery service executable on said plurality of processing nodes, the selected instances of the one or more network capabilities executable on the various said nodes, and operable to communicate with one another and to communicate with the single-domain discovery services to collect registration information from individual communication frameworks.

17. A system according to claim 15 wherein to execute the one or more selected network capability instances, said at least one processing node is programmed to share information between said single domain discovery services to propagate references to the network capabilities.

18. A system according to claim 15 wherein to select one or more network capabilities to be executed, said at least one processing node is programmed to:

identify the network capabilities while a network centric environment is operational; and identify the network capabilities prior to the network centric environment being operational.

19. A system according to claim 15 wherein the network capabilities are centrally defined and coordinated.

20. A system according to claim 15 wherein said at least one processing node is programmed to assign network capability instances to one or more capability categories, including at least one of platform independent capabilities which execute on a particular platform, but have no specific platform relationship, platform dependent capabilities which are constrained to execute on at least one particular platform, platform dependent capabilities which execute on one platform but are statically or dynamically allocated to control and interface with a separate platform, network dependent capabilities that are constrained to execute on a particular platform based on a network connectivity between that particular platform and another platform, and personnel dependent capabilities that are constrained to execute on behalf of specific system operators on specific platforms with which those operators interact.

* * * * *